Patented July 25, 1933

1,919,579

UNITED STATES PATENT OFFICE

KARL STREITWOLF, OF FRANKFORT-ON-THE-MAIN, ALFRED FEHRLE, OF BAD SODEN-ON-TAUNUS, AND WALTER HERRMANN, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

2-OXYMETHYLCARBOXYLIC ACID-BENZIMIDAZOLE-ARSONIC ACIDS AND PROCESS OF PREPARING THEM

No Drawing. Application filed June 20, 1931, Serial No. 545,845, and in Germany July 22, 1930.

The present invention relates to 2-oxymethylcarboxylic acid-benzimidazole-arsonic acids of the following general formula

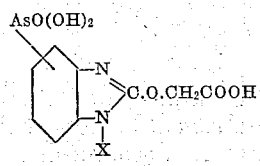

wherein X stands for hydrogen or alkyl, and to a process of preparing them.

We have found that 2-oxymethylcarboxylic acid-benzimidazole-arsonic acids of the above formula are obtained by causing chloracetic acid to act upon benzimidazolone-arsonic acids of the following general formula

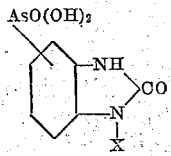

wherein X stands for hydrogen or alkyl. It has been found to be advantageous to carry out the reaction by heating the components in presence of a diluent, preferably in an aqueous solution and in the presence of alkali. From the solution the new compounds can be separated by the addition of mineral acid, e. g. of hydrochloric acid.

The new compounds which are water-soluble are valuable therapeutics and may also be used as intermediates for preparing other new therapeutics.

The following examples serve to illustrate the invention, but they are not intended to limit it thereto.

(1) 90 grams of 1-methylbenzimidazolone-5-arsonic acid are dissolved in 200 cc. of water and 83 cc. of caustic soda solution (40° Bé.) and 32 grams of chloracetic acid are introduced into this solution. After boiling for 1½ hours in a reflux apparatus, another 32 grams of chloracetic acid and 58 cc. of caustic soda solution (40° Bé.) are added and the whole is boiled for another hour. It is then cooled, neutralized with concentrated hydrochloric acid until there is a feebly alkaline reaction to turmeric and filtered. The 1-methyl-2-oxyacetic acid-benzimidazole-5-arsonic acid is separated from the filtrate by means of concentrated hydrochloric acid. The acid is recrystallized from water (1:6). The yield of recrystallized acid amounts to 80 grams. It melts at 308° C. with decomposition.

(2) 43 grams of benzimidazolone-5-arsonic acid are dissolved in 100 cc. of water and 41.5 cc. of caustic soda solution (40° Bé), 16 grams of chloracetic acid are added thereto and the whole is boiled for 1½ hours in a reflux apparatus. Another 16 grams of chloracetic acid and 29 cc. of caustic soda solution are added and the whole is boiled for another hour. It is then cooled and acidified. The unaltered parent material which has separated is removed by filtering by suction and the arsonic acid present in the filtrate is separated in the form of its arseno compound by means of hypophosphorous acid. The arseno compound which has been washed is dispersed in a small quantity of water and dissolved by addition of ammonia. This solution is oxidized in known manner and the 2-oxyacetic acid-benzimidazole-5-arsonic acid is then separated by means of hydrochloric acid. It is a white powder soluble in water. On heating it decomposes at about 275° C. with decomposition after previously sintering.

We claim:

1. The process which comprises causing chloracetic acid to act upon a compound of the following general formula

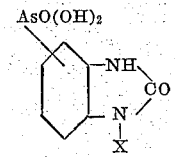

wherein X stands for hydrogen or alkyl.

2. The process which comprises heating chloracetic acid with the aqueous solution of a compound of the following formula

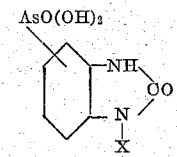

wherein X stands for hydrogen or methyl.

3. The process which comprises heating chloracetic acid with the aqueous solution of a compound of the following general formula

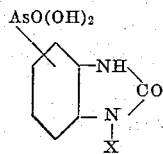

wherein X stands for hydrogen or methyl, in the presence of alkali.

4. The process which comprises heating chloracetic acid with the aqueous solution of a compound of the following general formula

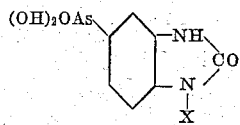

wherein X stands for hydrogen or methyl, in the presence of caustic soda solution, and separating the compound thus obtained by the addition of hydrochloric acid.

5. The compounds of the following general formula

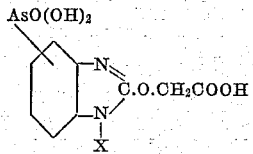

wherein X stands for hydroxy or alkyl, being valuable therapeutics.

6. The compounds of the following general formula

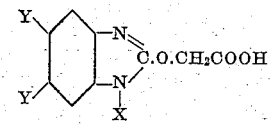

wherein one Y stands for $AsO(OH)_2$, the other Y for hydrogen and X stands for hydrogen or methyl, being valuable therapeutics.

7. The compound of the following formula

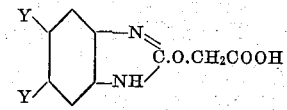

wherein one Y stands for $AsO(OH)_2$, the other Y for hydrogen, being a white powder soluble in water, decomposing at about 275° C. after previous sintering, being a valuable therapeutic.

8. The compound of the following formula

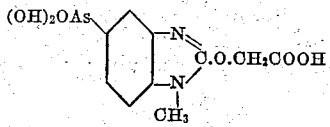

being a white powder soluble in water, melting at about 308° C. with decomposition and being a valuable therapeutic.

KARL STREITWOLF.
ALFRED FEHRLE.
WALTER HERRMANN.